Nov. 25, 1941.   F. B. SHAW   2,264,099
SYRINGE
Filed June 26, 1940

Inventor
Frank B. Shaw
By L. B. James
Attorney

Patented Nov. 25, 1941

2,264,099

UNITED STATES PATENT OFFICE 2,264,099

SYRINGE

Frank B. Shaw, Middleville, Mich.

Application June 26, 1940, Serial No. 342,573

1 Claim. (Cl. 128—272)

This invention relates to means for treating the udders and teats of cows, such as for milk fever, the general object of the invention being to provide a jar containing medicinal solution with means for forcing air through the solution and into the teats.

Another object of the invention is to provide means whereby the solution or liquid can be forced into the teats, when desired.

The invention also consists in certain other features of construction, combination and arrangement of the several parts, to be hereinafter fully described, illustrated in the accompanying drawing and specifically pointed out in the appended claim.

In describing the invention in detail reference will be had to the accompanying drawing wherein like characters denote like or corresponding parts throughout the several views, and in which:

Fig. 1 is a vertical sectional view through the device.

Figure 2:
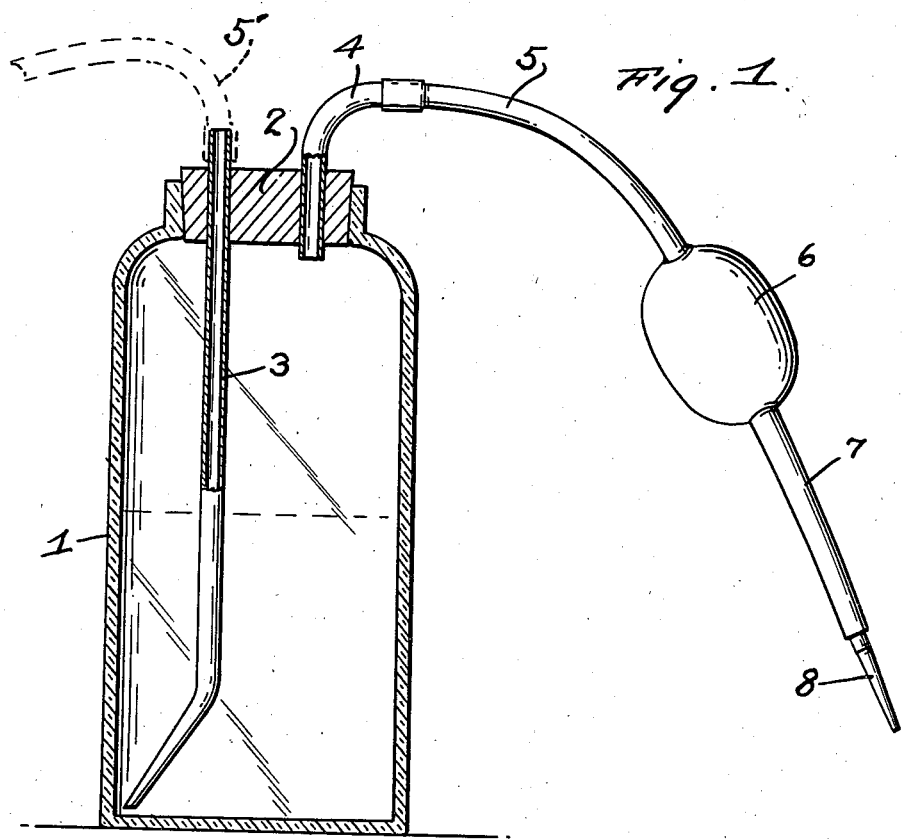
Fig. 2 is a detail sectional view showing a modification of the cap means.

In these views, the numeral 1 indicates a jar or other suitable receptacle, which has a stopper 2 therein.

A long tube 3 of rubber or other suitable material passes through the stopper to a point adjacent the bottom of the jar and the lower end of the tube is bent, as shown and said tube has its upper end projecting above the stopper, to permit air to enter the jar through the tube. A short tube 4, either of metal or stiff rubber also passes through the stopper and has its upper end curved as shown so a rubber tube 5 leading to a bulb 6, can be attached thereto. This bulb is of the usual "pump" type so that when depressed it will force fluid therefrom through the outlet tube 7 and nozzle 8, and when released will draw air thereinto from the jar and thus create a vacuum in the jar to cause air to enter the jar through the tube 3 and this air will pass up through the liquid in the jar and thus be forced by the bulb into the teat into which the nozzle 8 has been inserted.

If it is desired to force the liquid into the teat, then the hose or tube 5 is placed over the outer end of the tube 3, as shown in dotted line at 5'. Then when the bulb is manipulated the liquid from the jar will be forced into the teat, the liquid taken from the jar being replaced by the air entering the tube 4.

Figure 3:
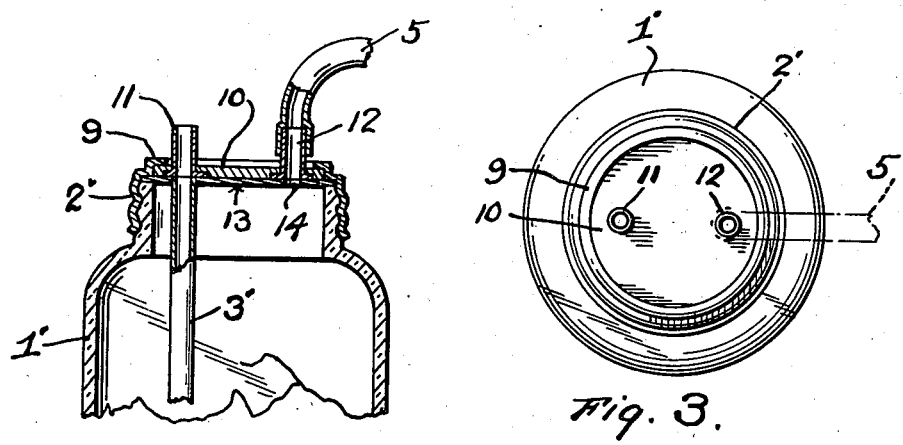
Fig. 3 is a plan view of Fig. 2.

Figs. 2 and 3 show a modification of the invention in which a jar 1' having a screw cap 2' is used. This cap has an opening 9 in its top which is closed by a disk 10 which has two short tubes 11 and 12 passing therethrough, each tube having a flange at its lower end which is embedded in the lower face of the disk, so that the disk can be rotated without interference from the tubes. A larger disk 13 is located under the first disk and has holes 14 therein which register with the bores of the tubes, when the disk 10 is in either one of two positions. A long tube 3' is fastened to the disk 13 and is in communication with the hole 14 and extends to a point adjacent the lower end of the jar.

Thus when the parts are in the position shown in Fig. 2, with the tube 5 leading to the bulb, connected with the tube 12, medicated air will be forced into the teat, as in Fig. 1, but by loosening the cap 2' and rotating disk 10 to place the tubes 11 and 12 in an opposite position from that shown in Fig. 11, then liquid from the jar will be forced into the teat.

It is thought from the foregoing description that the advantages and novel features of the invention will be readily apparent.

It is to be understood that changes may be made in the construction, combination and arrangement of the several parts, provided such changes fall within the scope of the appended claim.

What I claim and desire to protect by Letters Patent is:

A device for treating the udders and teats of cows comprising a jar having an externally threaded neck at its upper end, upper and lower disks, the lower disk being of greater diameter than the upper disk and having its marginal portions projecting from the upper disk and resting upon the upper edge of the neck, the lower disk being formed with openings spaced from each other diametrically thereof and the upper disk having diametrically spaced openings movable into and out of registry with openings in the lower disks by turning of the upper disk, the under face of the upper disk being formed with recesses surrounding the openings therein, a collar screwed upon said neck and having its upper portion reduced in diameter to provide stepped shoulders overlapping marginal portions of said disks and clamping the disks stationary when the collar is tightened, a tube extending vertically in said jar with its upper end mounted through one opening of the lower disk, nipples mounted through the openings of the upper disk and having flat flanges about their lower ends seated in said recesses with their lower faces flush with the under face of the upper disk, said nipples having upper portions protruding from the upper disk and constituting means for turning the upper disk and moving a selected nipple into registry with the upper end of said tube, and a discharge tube detachably engageable with the protruding upper portion of a selected nipple.

FRANK B. SHAW.